United States Patent
Schumann

(10) Patent No.: US 11,327,284 B2
(45) Date of Patent: May 10, 2022

(54) MICROSCOPE SYSTEM

(71) Applicant: Leica Microsystems CMS GmbH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 308 days.

(21) Appl. No.: 16/333,263

(22) PCT Filed: Sep. 19, 2017

(86) PCT No.: PCT/EP2017/073580
§ 371 (c)(1),
(2) Date: Mar. 14, 2019

(87) PCT Pub. No.: WO2018/050907
PCT Pub. Date: Mar. 22, 2018

(65) Prior Publication Data
US 2019/0250387 A1 Aug. 15, 2019

(30) Foreign Application Priority Data
Sep. 19, 2016 (DE) ...................... 10 2016 011 227.1

(51) Int. Cl.
*G02B 21/06* (2006.01)
*G02B 21/00* (2006.01)
(Continued)

(52) U.S. Cl.
CPC ..... *G02B 21/0048* (2013.01); *G02B 21/0032* (2013.01); *G02B 21/082* (2013.01); *G02B 21/36* (2013.01); *G02B 21/367* (2013.01)

(58) Field of Classification Search
CPC ........ G02B 21/00; G02B 21/08; G02B 21/36; G02B 21/0032; G02B 21/0048;
(Continued)

(56) References Cited

U.S. PATENT DOCUMENTS 7,573,635 B2  8/2009  Uhl
8,582,203 B2  11/2013  Dunsby
(Continued)

FOREIGN PATENT DOCUMENTS

DE        4026130 C2    9/1998
DE    102010060121 A1    4/2012
(Continued)

OTHER PUBLICATIONS

Köster, Isabelle and Petra Haas, "Light Sheet and Confocal Microscopy," Optics and Photonics, Physics' Best, Apr. 2016, Wiley-VCH Verlag GmbH & Co. KGaA, Weinheim, Germany, pp. 22-25.
(Continued)

*Primary Examiner* — Stephone B Allen
*Assistant Examiner* — Jyotsna V Dabbi
(74) *Attorney, Agent, or Firm* — Leydig, Voit & Mayer, Ltd.

(57) ABSTRACT

A microscope system includes a light sheet microscopic functional unit that illuminates and images a sample in a first operating state with a light sheet-like illumination light distribution, and a scanning microscopic functional unit that illuminates and images the sample in a second operating state with a point-like illumination light distribution. A first scanning element uniaxially scans the sample, in the first operating state, with the light sheet-like illumination light distribution, and uniaxially scans the sample, in the second operating state, with the point-like illumination light distribution. A second scanning element uniaxially scans the sample, in the second operating state, with the point-like illumination light distribution, such that, in the second operating state, the second scanning element generates together with the first scanning element a biaxial scanning of the sample with the point-like illumination light distribution.

(Continued)

A controller is configured to switch between the first and second operating states.

15 Claims, 3 Drawing Sheets

(51) Int. Cl.
  *G02B 21/08* (2006.01)
  *G02B 21/36* (2006.01)
(58) Field of Classification Search
  CPC ............... G02B 21/082; G02B 21/367; G02B 21/0036; G02B 21/0076; G02B 21/0016; G02B 21/06; G02B 21/16; G02B 21/361; G02B 21/002; G02B 21/008; G02B 21/365; G02B 21/10; G02B 21/26; G02B 21/006; G02B 21/02; G02B 21/0028; G02B 21/0024; G02B 21/0052; G02B 21/0072; G02B 21/32; G02B 21/04; G02B 26/10; G02B 26/101; G02B 26/105; G02B 27/0068; G02B 27/0031; G02B 2207/114; G01N 21/6458; G01N 21/6428; G01N 21/6486; G01N 1/30; G01N 1/62; G06T 2207/10056; G06T 2207/10064
  USPC ........................................................ 359/385
  See application file for complete search history.

(56) References Cited

U.S. PATENT DOCUMENTS

| | | | |
|---|---|---|---|
| 8,619,237 B2 | 12/2013 | Hillman et al. | |
| 2011/0134521 A1* | 6/2011 | Truong | G02B 21/16 359/388 |
| 2012/0098949 A1 | 4/2012 | Knebel et al. | |
| 2012/0281264 A1 | 11/2012 | Lippert et al. | |
| 2012/0320438 A1 | 12/2012 | Knebel et al. | |
| 2013/0107358 A1 | 5/2013 | Knebel et al. | |
| 2013/0335818 A1 | 12/2013 | Knebel et al. | |
| 2015/0055093 A1* | 2/2015 | Ehlers | A61B 3/14 351/206 |
| 2016/0048012 A1 | 2/2016 | Knebel et al. | |
| 2016/0131881 A1* | 5/2016 | Boehme | G02B 21/0048 359/202.1 |
| 2017/0131534 A1 | 5/2017 | Lippert et al. | |
| 2017/0315339 A1* | 11/2017 | Schwedt | G02B 26/105 |

FOREIGN PATENT DOCUMENTS

| | | | | |
|---|---|---|---|---|
| DE | 102011000835 A1 | | 8/2012 | |
| DE | 102011051042 A1 | | 12/2012 | |
| DE | 102011054914 A1 | | 5/2013 | |
| DE | 102012109577 A1 | | 5/2013 | |
| DE | 102012211943 A1 | | 6/2014 | |
| DE | 102013213781 A1 | | 9/2014 | |
| DE | 102014102215 A1 | * | 8/2015 | ............. H04N 5/372 |
| JP | 2000097857 A | * | 4/2000 | ............. G01N 21/64 |
| JP | 2000097857 A | | 4/2000 | |
| JP | 2013506151 A | | 2/2013 | |
| WO | WO 2015109323 A2 | | 7/2015 | |
| WO | WO-2015181068 A1 | * | 12/2015 | ......... G02B 21/0032 |
| WO | WO-2016075195 A1 | * | 5/2016 | ......... G02B 21/0032 |

OTHER PUBLICATIONS

Köster, Isabelle and Petra Haas, "Light Sheet Microscopy Turned Vertically," Microscopy, Optik&Photonik, Apr. 2015, Wiley-VCH Verlag GmbH & Co. KGaA, Weinheim, Germany, pp.39-43.

Stelzer, Ernst H.K., "The Intermediate Optical System of Laser-Scanning Confocal Microscopes," Handbook of Biological Confocal Microscopy, Third Edition, ed. James B. Pawley, Springer Science+Business Media, LLC, New York, USA, Dec. 2006, pp. 207-210.

* cited by examiner

MICROSCOPE SYSTEM

CROSS-REFERENCE TO PRIOR APPLICATIONS

This application is a U.S. National Stage Application under 35 U.S.C. § 371 of International Application No. PCT/EP2017/073580 filed on Sep. 19, 2017, and claims benefit to German Patent Application No. DE 10 2016 011 227.1 filed on Sep. 19, 2016. The International Application was published in German on Mar. 22, 2018 as WO 2018/050907 A1 under PCT Article 21(2).

FIELD

The invention relates to a microscope system having a light sheet microscopic functional unit which is designed to image a sample in a first operating state of the microscope system by means of a light sheet-like illumination light distribution, and to a functional unit using scanning microscopy which is designed to image the sample in a second operating state of the microscope system by means of a point-like illumination light distribution.

BACKGROUND

Known from the prior art are what are known as light plate or light sheet microscopes which generate a light sheet-like illumination light distribution in order to illuminate only a thin layer in the sample. In addition to light sheet microscopes that have two separate objective lenses at the sample side for illumination and detection, by now, light sheet microscopes are also used that make do with a single objective lens facing toward the sample. For example, in U.S. Pat. No. 8,582,203 B2, a microscope is proposed in which, using a cylindrical lens arranged before the objective lens, the illumination light is focused in the sample in such a manner that a light sheet that is inclined relative to the optical axis of the objective lens results. Due to this inclination, such a microscope is also referred to as an oblique plane microscope (OPM).

Known from U.S. Pat. No. 8,619,237 B2 is a variation of an oblique plane microscope that enables a scanning of the sample volume with the aid of two deflection elements, which scanning is directed laterally, i.e., transversally to the direction of light propagation. Such a microscope is also referred to as a SCAPE microscope (SCAPE: "swept confocally-aligned planar excitation").

While a light sheet microscope thus images the sample by means of a light sheet-like illumination light distribution, in conventional scanning microscopes, e.g., confocal or multiphoton microscopes, the sample imaging takes place point-by-point. Such a scanning microscope accordingly generates point-like illumination light distribution that, with the aid of scanning elements, is moved across the sample in order to scan this along two orthogonal scanning axes with the illumination light distribution. An overview of the multitude of scanning microscope systems can be found in, for example, J. Pawley, Handbook of Biological Confocal Microscopy, ISBN 978-0-387-45524-2.

With regard to the prior art, reference is also made to U.S. Pat. No. 7,573,635 B2, which discloses a microscope having a galvanometer mirror arrangement for switching between conoscopic and orthoscopic imaging.

Both oblique plane microscopes and scanning microscopes, which are respectively provided with one or more scanning elements in order to scan the sample with the respective illumination light distribution, require a telescope system that images the exit pupil of the sample-side objective lens in the form of a real image onto the respective scanning element. In order to ensure an adequate imaging quality, such a telescope system must be extremely low in aberration, for both orthoscopic and conoscopic imaging. It is thereby comparatively expensive.

Furthermore, these telescope systems require access to the objective pupil. For this, conventional microscopes possess corresponding interfaces in the form of connections—for example, flanges. The provision of such interfaces is mechanically and optically complex and increases the space requirement of the microscope.

SUMMARY

In an embodiment, the present invention provides a microscope system which includes a light sheet microscopic functional unit that illuminates and images a sample in a first operating state of the microscope system with a light sheet-like illumination light distribution, and a scanning microscopic functional unit that illuminates and images the sample in a second operating state of the microscope system with a point-like illumination light distribution. A first scanning element uniaxially scans the sample, in the first operating state, with the light sheet-like illumination light distribution generated by the light sheet microscopic functional unit, and uniaxially scans the sample, in the second operating state, with the point-like illumination light distribution generated by the scanning microscopic functional unit. A second scanning element uniaxially scans the sample, in the second operating state, with the point-like illumination light distribution generated by the scanning microscopic functional unit, such that, in the second operating state, the second scanning element generates together with the first scanning element a biaxial scanning of the sample with the point-like illumination light distribution generated by the scanning microscopic functional unit. A controller is configured to switch between the first operating state and the second operating state.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
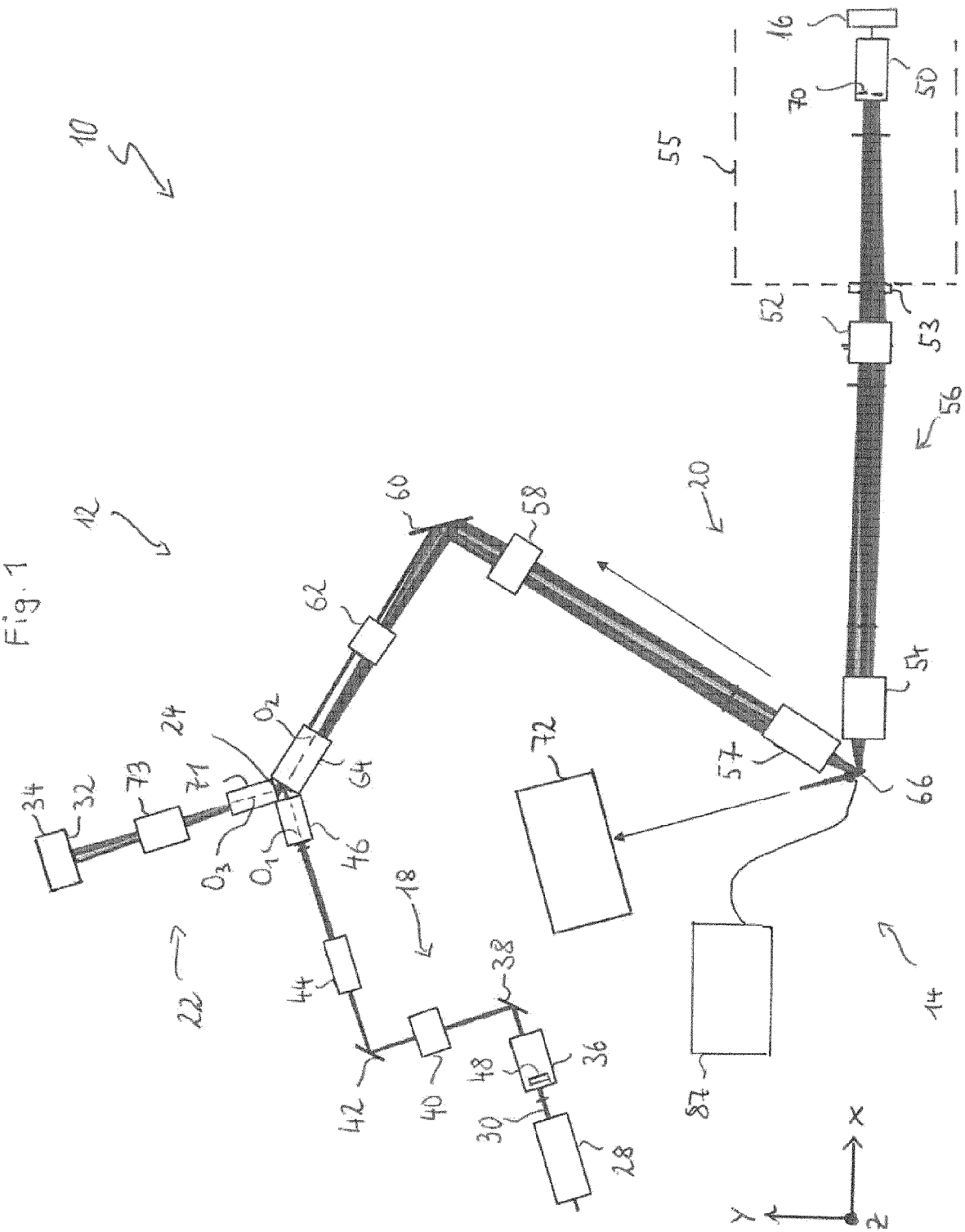
FIG. 1 shows a schematic representation of a microscope system as an exemplary embodiment.

Since the two microscopy applications described in the preceding, viz., oblique plane microscopy and scanning microscopy operating point-by-point, represent applicatively complementary imaging approaches which can profitably complement one another in the sample analysis, it is advantageous to provide a microscope system with which the two imaging methods can be combined with one another.

Embodiments of the invention provide a microscope system and a method for light microscopy imaging of a sample that, with comparatively little technical outlay, allow both a light sheet microscopy and a scanning microscopy application.

The microscope system according to an embodiment of the invention comprises: a light sheet microscopic functional unit which is designed to illuminate and image a sample in a first operating state of the microscope system by means of a light sheet-like illumination light distribution; a functional unit using scanning microscopy which is designed to illuminate and image the sample in a second operating state of the microscope system by means of a point-like illumination light distribution; a first scanning element that is designed to uniaxially scan the sample, in the first operating state, with the light sheet-like illumination light distribution generated by the light sheet microscopic functional unit, and uniaxially scans the sample, in the second operating state, with point-like illumination light distribution generated by the scanning microscopic functional unit; a second scanning element that is designed to uniaxially scan the sample, in the second operating state, with the point-like illumination light distribution generated by the functional unit using scanning microscopy, and thereby to produce, in the second operating state, together with the first scanning element, a biaxial scanning of the sample with the point-like illumination light distribution generated by the functional unit using scanning microscopy; and a control unit that is designed to switch between the first operating state and the second operating state.

The invention, according to an embodiment, makes use of the fact that both an oblique plane microscope, e.g., an OPM or a SCAPE microscope, and a scanning microscope of the aforementioned type possess a uniaxial scanning element, i.e., an element that produces a light scanning along a single scanning axis. In the oblique plane microscope, this element, referred to as a scanning element, serves to move the light sheet-like illumination light distribution transversally to the propagation direction of the illumination light for volume imaging. By contrast, in the scanning microscope, it produces one of the two, typically orthogonal, scanning movements of the point-like light distribution. This element, presently referred to as a first scanning element, may thus be used for scanning illumination of the sample in both the light sheet microscopic functional unit and in the scanning microscopic functional unit. In the first operating state of the microscope system, in which the light sheet microscopic imaging takes place, the first scanning element alone is sufficient to scan the sample with the illumination light. By contrast, in addition to the first scanning element, an embodiment of the invention provides, in the second operating state of the microscope system, which serves for scanning microscopic imaging by means of a point-like illumination light distribution, for the use of a second scanning element that likewise produces a uniaxial scanning. In the second operating state, the two scanning axes are thereby preferably situated orthogonal to one another. The two scanning elements, which, considered independently, act uniaxially, thus, in their interaction, form a biaxial scanning system.

Via the first scanning element used in the two operating states according to an embodiment of the invention, the microscope system combines the two applicatively complementary imaging methods of a light sheet microscope and a scanning microscope operating point-by-point. The switchover between these two imaging methods is coordinated by a control unit. For example, this may be designed in such a way that it is responsible solely for the control of the scanning elements, and otherwise cedes control to separate control devices which, in particular, control the two different imaging processes. Alternatively, however, the control unit may also control the overall operation of the microscope system, i.e., also all imaging processes.

In the second operating state of the microscope system, the first scanning element and the second scanning element preferably form a telecentric scanning system.

The light sheet microscopic functional unit and the scanning microscopic functional unit preferably have a common objective lens facing the sample, respectively for illumination and detection. This enables a particularly compact design of the microscope system according to the invention.

In a particularly preferred embodiment, the light sheet microscopic functional unit and the scanning microscopic functional unit have common telescope optics that image an exit pupil of the objective lens onto the first scanning element. Since telescope optics which can be used for generating a pupil image, as mentioned above, have a particularly low aberration and therefore are comparatively expensive, the joint use of the telescope optics offers a considerable cost advantage.

The microscope system preferably has a microscope stand which carries the common objective lens, which microscope stand possesses a connection element to which the common telescope optics can be connected. In this way, the microscope system can be particularly simply combined, in the manner of a microscope module, with an already existing microscope stand, e.g., of an upright microscope, an inverted microscope, or a fixed stage microscope. In particular, it is advantageous here that the light sheet microscopic functional unit and the scanning microscopic functional unit possess the common telescope optics, so that only a single connection element must be provided for coupling to the microscope stand.

The first scanning element and the second scanning element are, for example, respectively executed as galvanometer mirrors or micro-electromechanical mirrors (MEMS). The first scanning element can thereby be tilted about a first tilt axis, and the second scanning element can thereby be tilted about a second tilt axis that is preferably orthogonal to the first tilt axis.

In a particularly preferred embodiment, in the first operating state, the first scanning element can be tilted within a first tilt angle range, and, in the second operating state, can be tilted within a second tilt angle range that differs from the first tilt angle range.

The microscope system preferably includes a switching element controllable by a control unit for switching between the first operating state and the second operating state.

The switching element is formed by the first deflection element, for example, which can be tilted between a tilt position within the first tilt angle range and a tilt position within the second tilt angle range in order to switch between operating states. This embodiment utilizes the fact that, as seen from the telescope optics imaging the objective pupil onto the first scanning element, two tilt angle ranges that are accessible to the first scanning element exist that may be associated with the two operating states. It is thus possible that the first scanning element, on the one hand, performs the applicatively necessary scanning along the first scanning axis, and, on the other, selects the appropriate tilt angle range, in order to realize the desired operating state. For this purpose, it may be appropriate to use the first scanning element at light incident angles different than 45 degrees.

In an alternative embodiment, the switching element is formed by a light deflection element provided separately from the first scanning element. This light deflection element is, for example, a mirror or prism which can be driven into the beam path and removed therefrom. It may also be executed in the form of a deflection element remaining in the beam path, which deflection element is adjusted, e.g., tilted, to select the operating state. This embodiment has the further advantage that the telescope optics which image the objective pupil onto the first scanning element need only be provided once, and occupy only one adaptation point at the microscope, insofar as the invention is executed as a module for a conventional microscope.

In an advantageous embodiment, the light sheet microscopic functional unit comprises: illumination optics which are designed to generate the light sheet-like illumination light distribution in an intermediate image space; transport optics, designed telecentrically on both sides, that are designed to image the light sheet-like illumination light distribution, generated in the intermediate image space, into the sample, and to image a region, illuminated with the light sheet-like illumination light distribution, of the sample as an intermediate image into the intermediate image space; and detection optics that are designed to image the intermediate image generated in the intermediate image space onto a detector, wherein the optical axes of the illumination optics, the transport optics, and the detection optics intersect one another in the intermediate image space, and wherein the first scanning element is arranged in the transport optics and designed, in the first operating state, to move the light sheet-like illumination light distribution transversally into the sample—preferably, orthogonally to the optical axis of the transport optics. The aforementioned transport optics, which include the telescope system shared by the light sheet microscopic functional unit and the scanning microscopic functional unit, represent an intermediate imaging system which has the properties required for volume imaging, viz., an enlargement level that corresponds to the refractive index ratio between sample space and intermediate space, in order to ensure correct imaging of the aperture angles, and a telecentricity on both sides, i.e., both object-side and image-side, i.e., a lateral registration, which is independent of the position along the optical axis.

Compared to conventional light sheet microscopes whose intermediate imaging optics are not telecentric on both sides, the use of transport optics that are telecentric on both sides and of a telecentric scanning arrangement that is therewith enabled has, among other things, the advantage that no distortions are caused in the transport optics.

In a particularly preferred embodiment, the scanning microscopic functional unit forms a confocal microscope or a multiphoton microscope.

In a schematic depiction, FIG. 1 shows the design of a microscope system 10, which represents an exemplary embodiment of the invention. The microscope system 10 comprises a light sheet microscopic functional unit, designated in general with 12 in FIG. 1, and a scanning microscopic functional unit, designated in general with 14 in FIG. 1. The microscope system 10 provides two, selectively adjustable operating states, viz., a first operating state in which the light sheet microscopic functional unit 12 is used in the manner of an oblique plane microscope for imaging a sample 16 using a light sheet-like illumination light distribution, and a second operating state in which the scanning microscopic functional unit 14 images the sample 16 using a point-like illumination light distribution.

In the following, the light sheet microscopic functional unit 12 will be described first.

The light sheet microscopic functional unit 12 comprises illumination optics 18, transport optics 20, and detection optics 22, whose optical axes $O_1$, $O_2$, or $O_3$ converge in an intermediate image space designated with 24 in FIG. 1, i.e., intersect one another there. The illumination optics 18 serve to focus the illumination light 30, supplied to them by a light source 28, into the intermediate image space 24 in such a way that an illumination light distribution is generated there in the manner of a light sheet. This light sheet generated in the intermediate image space 24 is then imaged by the transport optics 22 into the sample 16, so that a region of the sample 16 is illuminated with the light sheet and excited to emit fluorescent radiation. In the first operating state, the fluorescence radiation emitted by the sample 16 in turn arrives in the transport optics 20, which thus image the sample region illuminated with the light sheet as an intermediate image into the intermediate image space 24. The intermediate image of the illuminated sample region, which intermediate image is generated in the intermediate image space 24, is finally imaged by the detection optics 22 onto a detection surface 32 of a detector 34.

In the propagation direction of the illumination light 30 emitted from the light source 28, the illumination optics 18 contains, in series, a beam preparation unit 36, an adjustment element 38, an ocular lens system 40, an additional adjustment element 42, a tube lens element 44, and an illumination objective lens 46 that faces toward the intermediate image space 24.

The beam preparation unit 36 includes a cylindrical lens 48 that, in cooperation with the illumination objective lens 46, is part of an anamorphic optical system which has the function of generating the light sheet in the desired shape from the illumination light 30 emitted by the light source 28 in the intermediate image space 24. The cylindrical lens 48 thereby focuses the illumination light 30 into the image of the pupil of the illumination objective lens 46, said image being generated by the ocular lens system 40 and the tube lens system 44. In the exemplary embodiment according to FIG. 1, the tube lens system 44 and the ocular lens system 40 thus form a Galilean telescope with real intermediate image. However, it should be noted that the realization of the anamorphic optical system that is selected in the exemplary embodiment according to FIG. 1 is to be understood to be purely exemplary; for example—in particular, with smaller numerical apertures—it is also possible to use only the cylindrical lens 48 to shape the light sheet, omitting the illumination objective lens 46.

The two adjustment elements 38 and 42 contained in the illumination optics 18 form an adjustment device which makes it possible to adjust the light sheet relative to the detection surface 32 of the detector 34—more precisely stated, relative to the image of the detection surface 32 that is generated by the detection optics 22 in the intermediate image space 24—on which detection optics 22 the light sheet is superimposed. The adjustment element 42 is thereby arranged in a plane that is conjugated with an image plane of the illumination objective lens 46. Accordingly, the angle at which the illumination light 30 emerges from the illumination objective lens 46 is changed by tilting the adjustment element 42. The adjustment element 38 is arranged in a plane which is conjugated with the pupil plane of the illumination objective 46. The position of the illumination light 30 exiting from the illumination objective lens 46 can thus be adjusted via the adjustment element 38. The two adjustment elements 38 and 42 thus allow the position and angle of the light sheet to be adjusted independently of one another.

The illumination optics 18 may include further elements for generating the light sheet—for example, a field diaphragm and/or an aperture diaphragm. The field diaphragm here has the function of delimiting the light sheet in the direction in which it is expanded. By contrast, the aperture diaphragm serves to limit the aperture angle with which the light sheet is focused.

As seen from the sample 16, the transport optics 20 include an objective lens 50, a tube lens system 52, an ocular lens system 54, another ocular lens system 57, another tube lens system 58, a deflection element 60, an afocal system 62, and an intermediate imaging objective lens 64. Both the tube lens system 52 and the ocular lens system 48, as well as the tube lens system 58 and ocular lens system 57, respectively form Galilean telescope optics. The transport optics 20 are executed as a telecentric optical system on both sides. The afocal system 62 contained in the transport optics 20 serves to produce the enlargement level adaptation, required for the desired volume image transport, to the refractive index ratio between sample space and intermediate image space 24. The telescope optics 56 are coupled via a connection element 53 to a microscope stand 55 on which the objective lens 50 is held.

Figure 2:
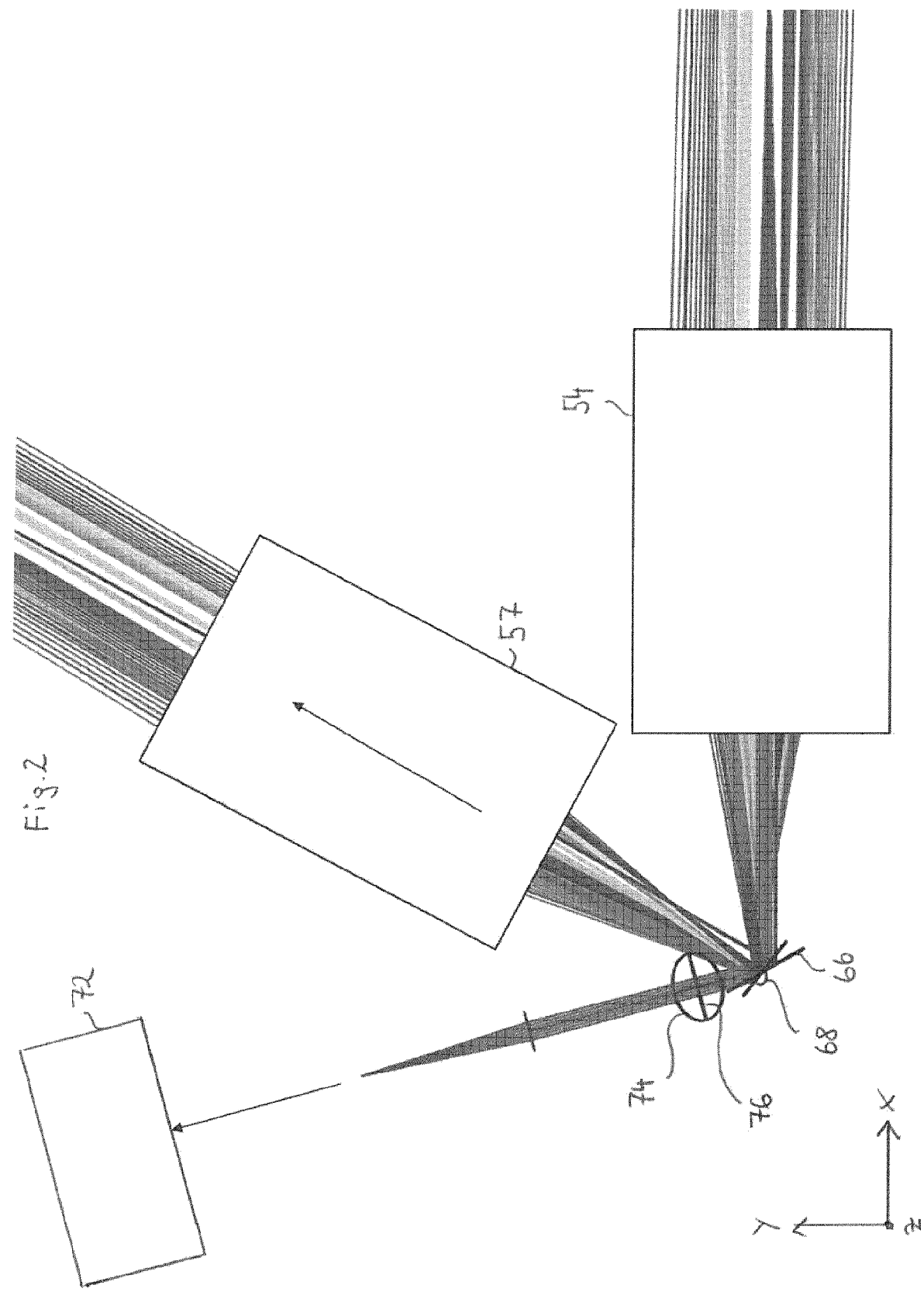
FIG. 2 shows an enlarged partial view which shows the two scanning elements of the microscope system according to FIG. 1.

As is apparent, in particular, in the enlarged partial view according to FIG. 2, the light sheet microscopic functional unit 12 contains in the transport optics 20 a first scanning element 66 that is executed as a galvanometer mirror or MEMS mirror, for example. The scanning element 66 can be tilted about a tilt axis 68 that, with reference to the coordinate system indicated in FIG. 2, coincides with the z-axis. In the first operating state of the microscope system 10, the scanning element 66 serves to scan the sample 16 laterally, i.e., transversally to the optical axis of the objective lens 50 with the light sheet. In order to produce this uniaxial scan, the scanning element 66 is tilted about the tilt axis 68 within a predetermined first tilt angle range. The scanning element 66 is arranged at a location at which the telescope optics 56 generate a real image of an exit pupil 70 of the objective lens 50. In other words, the telescope optics 56 thus image the exit pupil 70 onto the first scanning element 66.

The detection optics 22 include a detection objective lens 71 facing towards the intermediate image space 24, as well as a tube lens system 73. Via the detection objective lens 71 and the tube lens system 73, the intermediate image of the sample region that is illuminated by the light sheet, which intermediate image is generated by the transport optics 20 in the intermediate image space 24, is imaged onto the detector surface 32 of the detector 34.

In the first operating state of the microscope system 10, the illumination optics 18, the transport optics 20, and the detection optics 22 of the light sheet microscopic functional unit 12 are aligned to one another in such a way that their optical axes $O_1$, $O_2$, $O_3$ converge in the intermediate image space 24. The injection of the illumination light 30 generated by the light source 28 into the transport optics 20 thus effectively takes place via a geometric combination in the region of the intermediate image, which enables dichroic beam-splitter elements in the region of the transport optics 20 to be omitted. A pupil offset which negatively affects the imaging performance of the transport optics 20 may thus be reliably avoided.

In the following, the scanning microscopic functional unit 14 of the microscope system 10 is described that is operated in the second operating state.

Like the light sheet microscopic functional unit 12, the scanning microscopic functional unit 14 uses the objective lens 50 facing towards the sample 16, as well as the telescope optics 56 formed from the tube lens system 52 and the ocular lens system 54. The first scanning element 66 is also used by the scanning microscopic functional unit 14 in the second operating state. This means that the two functional units 12, 14 of the microscope system 10 have jointly-used components in the form of the objective lens 50, the telescope optics 56, and the first scanning element 66.

Furthermore, the scanning microscopic functional unit 14 possesses an excitation/detection module 72 which is spatially separate from the light sheet microscopic functional unit 12. This contains the components that are known per se, and therefore not explained in more detail at this point, which are required for the realization of a conventional microscope scanning point-by-point, e.g., one or more light sources, one or more detectors, further additional aperture diaphragms for illumination and detection in the case of a confocal microscope, etc. This accordingly applies to other embodiments, which, however, are also known per se, in the event that the scanning microscopic functional unit 14 is to be executed as, for example, a multiphoton microscope.

The scanning microscopic functional unit 14 further includes a second scanning element 74 that is visible only in the enlarged partial view according to FIG. 2. Like the first scanning element 66, the second scanning element 74 is also realized as a uniaxial galvanometer mirror or MEMS mirror, for example. The second scanning element 74 can be tilted about a tilt axis 76 which is orthogonal to the tilt axis 68 of the first scanning element 66. At this point, it is to be noted that the depiction in FIGS. 1 and 2 is greatly simplified. In particular, it is to be noted that the second scanning element 74 is inclined relative to the plane of the drawing according to FIG. 2—for example, by 45 degrees. As a result of this, the beam path between the second scanning element 74 and the excitation/detection module 72 also does not travel in the plane of the drawing, but rather out of or into this. Moreover, it is to be noted that components that are not explicitly shown in FIG. 2 may be present between the first scanning element 66 and the second scanning element 74, such as, in particular, additional telescope optics, via which a further real image of the exit pupil 70 of the objective lens 50 may be generated. It is thereby possible to arbitrarily position the second scanning element 74, which is to be located at the site of this pupil image, in the beam path of the scanning microscopic functional unit 14.

In the second operating state of the microscope system 10, the first uniaxial scanning element 66 and the second uniaxial scanning element 76 form a telecentric biaxial scanning system which may be used to biaxially scan the sample 16 with the point-like illumination light distribution generated in the scanning microscopic functional unit 14, i.e., to scan along two, preferably orthogonal scanning axes. Both of these scanning elements 66 and 76 forming this biaxial scanning system are conjugated with the exit pupil 70 of the objective lens 50.

It is to be noted that the aforementioned realization of the biaxial scanning system is to be understood purely as an example. In particular, the possibility also exists of forming a telecentric biaxial scanning system, in that a virtual tilt point is generated by using two additional uniaxial scanning elements, as this is described in DE 40261302 C2.

In the second operating state, the first scanning element 66 thus has the function, in cooperation with the second scanning element 74, of providing for a biaxial scanning of the sample 16 with the point-like illumination light distribution. For this purpose, the first scanning element is tilted about the tilt axis 68 within a second tilt angle range 68 that differs from the first tilt angle range used in the first operating state. Thus, as seen from the common telescope optics 56, two tilt angle ranges that are accessible by means of the first scanning element 66 exist, of which the first is associated with the first operating state, and the second is associated with the second operating state. This offers the possibility of using the first scanning element 66, not only for the actual scanning operation that is performed in the first or in the second operating state, but, rather, additionally as an element for switching between the first operating state and the second operating state. Namely, if the first scanning element 66 is located in a tilted position that is within the first tilt angle range, in the shown arrangement, the first scanning element 66 is necessarily connected to the light sheet microscopic functional unit 12, whereby the first operating state is realized. If the scanning element is then tilted into the second tilting angle range, it is connected to the scanning microscopic functional unit 14, whereby the second operating state is selected.

The microscope system 10 also possesses a control unit 87 that controls the switching of the operating states via a corresponding activation of the first scanning element 66. The control unit 87 may be executed such that it also controls some other, or even all, operating processes of the microscope system 10.

Figure 3:
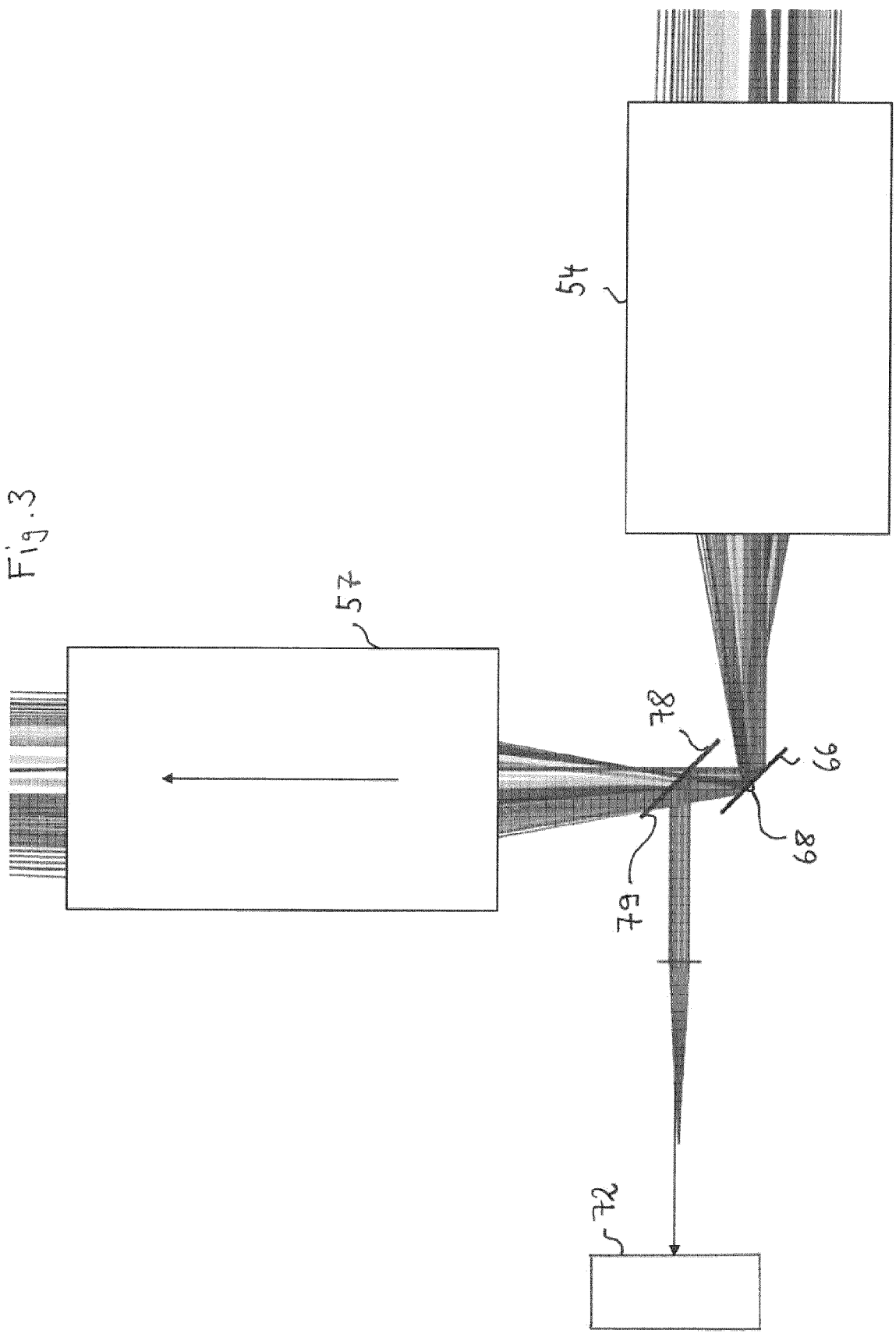
FIG. 3 shows a partial view, corresponding to FIG. 2, of a modified embodiment that has a separate light deflection element for switching between the two microscopic functional units.

FIG. 3 shows a modified embodiment in which a separate switching element 78 is specially provided for switching between the two operating states. In the shown embodiment, the switching element 78 is, for example, a mirror that has a mirror surface 79 facing towards the first scanning element 66 and is introduced into the beam path between the two ocular lens systems 54, 57, in order to effectively switch to the scanning microscopic functional unit 14, i.e., to set the second operating state. If the mirror 78 is removed from the beam path, the microscope system 10 is thus in the first operating state.

It is inherently understood that the invention shall not be limited to the exemplary embodiments described in the preceding.

For example, instead of the cylindrical mirror 48, it is possible to provide an additional uniaxial scanning element, e.g., in the form of a galvanometer mirror or an MEMS mirror, in the illumination optics 18 of the light sheet microscopic functional unit 12, for light sheet generation. Such a scanning element may, for example, be arranged at the location at which the adjustment element 38 is located in the exemplary embodiment according to FIG. 1. The scanning element then produces a scanning movement of the illumination light 30, via which the desired light sheet is sequentially constructed. The control unit 87 then ensures that the operation of this scanning element is synchronized with the other system components—in particular, with the first scanning element 66.

In the modification cited in the preceding, the further scanning element that is additionally present in the illumination optics 18 might be similarly used for functional coupling of a functional unit scanning point-by-point, as this is described further above in the exemplary embodiment according to FIGS. 1 through 3 for the first scanning element 66. A tilt angle range of this further scanning element that is not used for light sheet generation might, accordingly, be used, corresponding to the second tilt angle range of the scanning element 66 for the scanning microscopic scanning, and possibly also for switching between the two operating states.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

10 Microscope system
12 Light sheet microscopic functional unit
14 Scanning microscopic functional unit
16 Sample
18 Illumination optics
20 Transport optics
22 Detection optics
24 Intermediate image space
28 Light source
30 Illumination light
32 Detector surface
34 Detector
36 Beam preparation unit
38 Adjustment element
40 Ocular lens system
42 Adjustment element
44 Tube lens system
46 Illumination objective lens
48 Cylindrical mirror
50 Objective lens
52 Tube lens system
53 Connection element
54 Ocular lens system
55 Microscope stand
56 Telescope optics
57 Ocular lens system
58 Tube lens system
60 Deflection system
62 Afocal system
64 Intermediate imaging objective lens 66 First scanning element
68 Tilt axis
70 Exit pupil
71 Detection objective lens
72 Excitation/detection module
73 Tube lens system
74 Second scanning element
76 Tilt axis
78 Switching element
79 Mirror surface
87 Control unit
$O_1, O_2, O_3$ Axes

The invention claimed is:

1. A microscope system, comprising:
a light sheet microscopic functional unit that illuminates and images a sample in a first operating state of the microscope system with a light sheet-like illumination light distribution,
a scanning microscopic functional unit that illuminates and images the sample in a second operating state of the microscope system with a point-like illumination light distribution,
a first scanning element that uniaxially scans the sample, in the first operating state, with the light sheet-like illumination light distribution generated by the light sheet microscopic functional unit, and uniaxially scans the sample, in the second operating state, with the point-like illumination light distribution generated by the scanning microscopic functional unit,
a second scanning element that uniaxially scans the sample, in the second operating state, with the point-like illumination light distribution generated by the scanning microscopic functional unit, such that, in the second operating state, the second scanning element generates together with the first scanning element a biaxial scanning of the sample with the point-like illumination light distribution generated by the scanning microscopic functional unit, and
a controller configured to switch between the first operating state and the second operating state.

2. The microscope system according to claim 1, wherein the first scanning element and the second scanning element form a telecentric scanning system in the second operating state.

3. The microscope system according to claim 1, wherein the light sheet microscopic functional unit and the scanning microscopic functional unit have a common objective lens facing toward the sample, the common objective lens respectively serving for both illumination and detection.

4. The microscope system according to claim 1, wherein the first scanning element is tiltable about a first tilt axis, and the second scanning element is tiltable about a second tilt axis.

5. The microscope system according to claim 4, wherein, in the first operating state, the first scanning element is tiltable within a first tilt angle range, and, in the second operating state, is tiltable within a second tilt angle range that differs from the first tilt angle range.

6. The microscope system according to claim 1, further comprising a switching element which is controllable by the controller and is configured to switch between the first operating state and the second operating state.

7. The microscope system according to claim 6, wherein the switching element comprises the first scanning element, which is tiltable between a tilt position situated within the first tilt angle range, which realizes the first operating state, and a second tilt position situated within the second tilt angle range, which realizes the second operating state, for switching between the first operating state and the second operating state.

8. The microscope system according to claim 6, wherein the switching element comprises a light deflection element which is separate from the first scanning element and is insertable into a beam path such that when the light deflection element is not arranged in the beam path, the microscope system is in the first operating state, and when the light deflection element is arranged in the beam path, effectively switches to the scanning microscopic functional unit such that the microscope system is in the second operating state.

9. The microscope system according to claim 1, wherein the scanning microscopic functional unit has an excitation/detection module which is spatially separate from the light sheet microscopic functional unit and is effectively switched to in the second operating state.

10. The microscope system according to claim 1, wherein the light sheet microscopic functional unit comprises:
illumination optics that are designed to generate the light sheet-like illumination light distribution in an intermediate image space,
transport optics that are designed to be telecentric on both sides of the transport optics, the transport optics being designed to image the light sheet-like illumination light distribution, generated in the intermediate image space, into the sample, and to image a region, illuminated with the light sheet-like illumination light distribution, of the sample as an intermediate image into the intermediate image space, and
detection optics that are designed to image the intermediate image generated in the intermediate image space onto a detector,
wherein optical axes of the illumination optics, the transport optics, and the detection optics intersect one another in the intermediate image space, and
wherein the first scanning element is arranged in the transport optics and designed, in the first operating state, to move the light sheet-like illumination light distribution in the sample transversally to the optical axis of the transport optics.

11. The microscope system according to claim 10, wherein the transport optics do not have a beam splitter.

12. The microscope system according to claim 1, wherein the scanning microscopic functional unit forms a confocal microscope or a multiphoton microscope.

13. A method for imaging a sample using a microscope system, the method comprising:
setting a first operating state of the microscope system, in which the sample is illuminated and imaged with a light sheet microscopic functional unit having a light sheet-like illumination light distribution,
setting a second operating state of the microscope system, in which the sample is illuminated and imaged with a scanning microscopic functional unit having a point-like illumination light distribution,
wherein the sample, in the first operating state, is uniaxially scanned by a first scanning element with the light sheet-like illumination light distribution generated by the light sheet microscopic functional unit, and
wherein the sample, in the second operating state, is both uniaxially scanned with the point-like illumination light distribution generated by the scanning microscopic functional unit, by the first scanning element, and uniaxially scanned, by an additional, second scanning element in an additional axis, whereby a biaxial scanning of the sample is generated using both the first and second scanning elements.

14. A microscope system, comprising:

a light sheet microscopic functional unit that illuminates and images a sample in a first operating state of the microscope system with a light sheet-like illumination light distribution, a scanning microscopic functional unit that illuminates and images the sample in a second operating state of the microscope system with a point-like illumination light distribution, a first scanning element that uniaxially scans the sample, in the first operating state, with the light sheet-like illumination light distribution generated by the light sheet microscopic functional unit, and uniaxially scans the sample, in the second operating state, with the point-like illumination light distribution generated by the scanning microscopic functional unit, a second scanning element that uniaxially scans the sample, in the second operating state, with the point-like illumination light distribution generated by the scanning microscopic functional unit, such that, in the second operating state, the second scanning element generates together with the first scanning element a biaxial scanning of the sample with the point-like illumination light distribution generated by the scanning microscopic functional unit, and a controller configured to switch between the first operating state and the second operating state, wherein the light sheet microscopic functional unit and the scanning microscopic functional unit have a common objective lens facing toward the sample, the common objective lens respectively serving for both illumination and detection, and wherein the light sheet microscopic functional unit and the scanning microscopic functional unit have common telescope optics that image an exit pupil of the objective lens onto the first scanning element.

15. The microscope system according to claim 14, further comprising a microscope stand carrying the common objective lens, the microscope stand having a connection element to which the common telescope optics is connectable.

* * * * *